United States Patent [19]
Bauer et al.

[11] Patent Number: 5,979,985
[45] Date of Patent: Nov. 9, 1999

[54] MOTOR VEHICLE SEAT WITH A BACK REST AND A SEAT

[75] Inventors: Heinz Bauer; Burckhard Becker; Ernst-Reiner Frohnhaus, all of Solingen, Germany

[73] Assignee: C. Rob. Hammerstein GmbH & Co. K.G., Solingen, Germany

[21] Appl. No.: 08/966,610

[22] Filed: Nov. 10, 1997

[30] Foreign Application Priority Data

Nov. 11, 1996 [DE] Germany ............................ 196 46 470

[51] Int. Cl.⁶ ............................................................. B60N 2/12
[52] U.S. Cl. ...................... 297/340; 297/322; 297/344.15
[58] Field of Search .................................... 297/340, 316, 297/322, 344.15

[56] References Cited

U.S. PATENT DOCUMENTS

| | | | |
|---|---|---|---|
| 3,727,976 | 4/1973 | Lystad | 297/340 |
| 4,767,157 | 8/1988 | Kazaoka et al. | 297/340 X |
| 5,145,232 | 9/1992 | Dal Monte | 297/322 X |
| 5,733,005 | 3/1998 | Aufrere et al. | 297/340 |

FOREIGN PATENT DOCUMENTS 06275509 10/1994 Japan ................................ 297/344.15

*Primary Examiner*—Peter M. Cuomo
*Assistant Examiner*—Rodney B. White
*Attorney, Agent, or Firm*—John Lezdey & Assoc.

[57] ABSTRACT

The invention relates to a motor vehicle seat with a back rest and a seat which is supported by an adjustable underframe, which itself is supported via seat carriers of a longitudinal adjustment device. The back rest is supported by a back rest support, which is connected with the back rest via a back rest mounting. The back rest support is joined in a hinge with the seat carriers via front and back brackets of the back rest support and the seat is joined in a hinge with the seat carriers via front and back brackets of the seat support in an adjustable way.

13 Claims, 2 Drawing Sheets

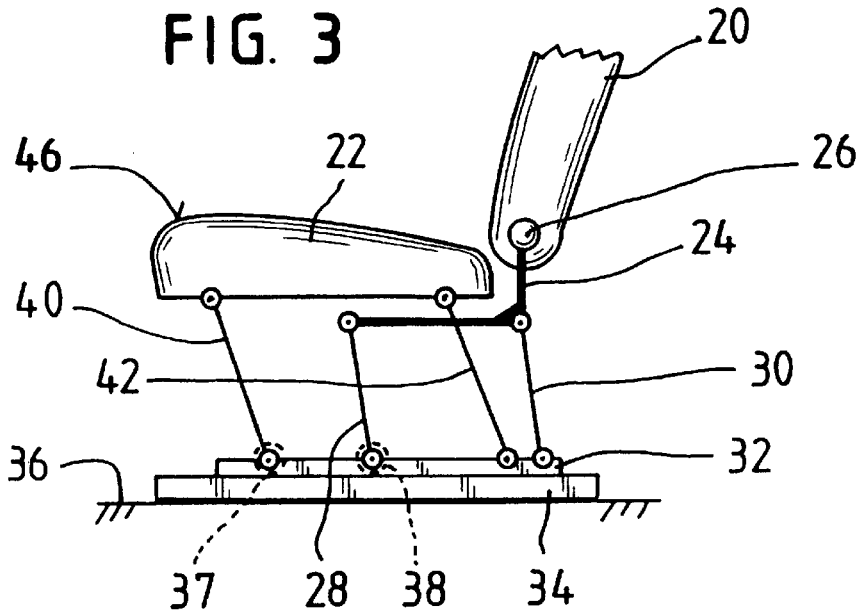
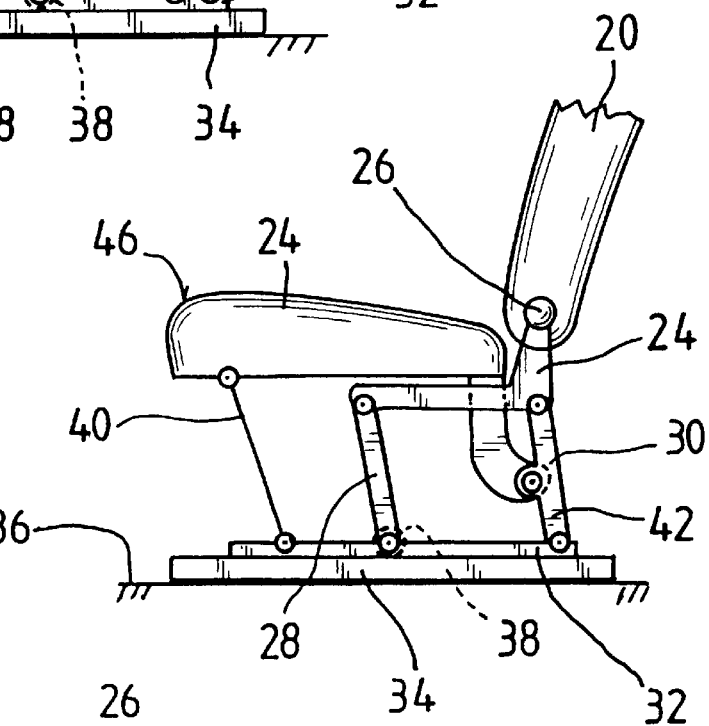
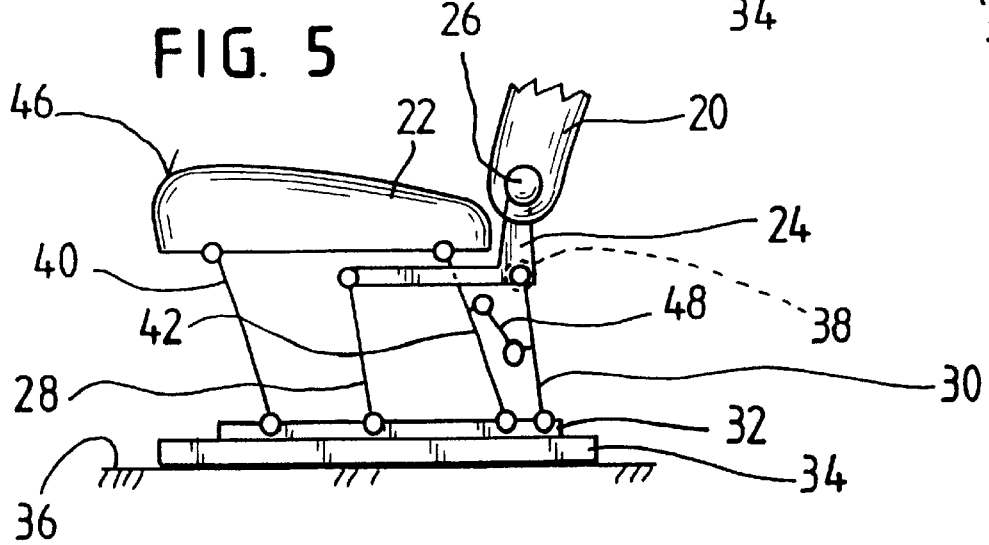

MOTOR VEHICLE SEAT WITH A BACK REST AND A SEAT

BACKGROUND OF THE INVENTION

Field of the Invention

The invention relates to a motor vehicle seat with a back rest and a seat, which is supported by an adjustable underframe, which itself is supported via seat carriers of a longitudinal adjustment device.

With motor vehicle seats, an adjustment of the usable seat depth of the seat is desired, adjusting devices herefore are known from the state of the art. On the one hand motor vehicle seats can be counted to the latter, with which the actual length of the seat can be altered and also those, with which the back rest can be moved with regard to the seat in a relative movement in such a way that the seat depth used effectively is altered. The motor vehicle seat according to the invention belongs to the latter group.

It is desired to achieve a most possible comfortable, ergonomic seating position with motor vehicle seats by using simple mechanical means. Hereby, the normal dimensional relations of human beings are taken as a basis and by taking this relation into account, the possibilities for a seat adjustment can thereby be limited. With regard to this aspect, it is the aim of the invention to further develop the motor vehicle seat. It is therefore the task of the present invention to determine and further develop a motor vehicle seat in such a way that a most possible optimal adjustment of the back rest and the seat is achieved with regard to the desired seating position by using simple mechanical means.

Based on the motor vehicle seat of the above mentioned kind this task is solved in such a way that the back rest is supported by a back rest support which is connected to the back rest via a back rest mounting, that the back rest support is joined in a hinge with the seat carriers via front and back brackets of the back rest support and that the seat is joined in a hinge with the seat carriers via front and back brackets of the seat support in an adjustable way.

According to the invention the back rest and the seat are each arranged on individual four-bar linkages, especially joint parallelogram brackets, and they can also be interactively adjusted. These four-bar linkages are each regulated as well as set by an adjustment device, which is allocated to one of the four hinge points. Herefore different adjustment devices exist, which are known from the state of the art, for example adjustment devices with a sector gear and a pinion, eccentric adjustment devices and devices of a similar kind. As the back rest as well as the seat form a four-bar linkage together with each of the corresponding brackets and the seat carrier, a relative adjustment is possible between the back rest and the seat. Thereby the seat depth to be used can be adjusted by adjusting the seat in relation to the back rest or the back rest in relation to the seat.

In a preferred embodiment the four-bar linkages, with which the seat and the back rest support are connected with the seat carriers, are coupled in a compulsive action. As separate adjustment devices for the back rest on one hand and for the seat on the other hand are necessary with uncoupled four-bar linkages, this is not the case with coupled four-bar linkages, hereby only an adjustment device is necessary. Thereby the expenditure is saved and the operation is simplified. Therefore, in an especially preferred embodiment, the back support bracket of the back rest is comprised each in one piece with the left back support bracket of the seat support each, the same applies to the right back support bracket of the back rest and of the seat support respectively. The kinematics is thereby chosen in such a way that when adjusting the back rest and the seat to the front, the back rest is moved more strongly to the front than the seat, namely the usable seat surface is being shortened. Because of that in the course of the normal adjustment of a seat based on the position for larger people to the position for smaller people, the normal adjustment path of the seat is kept, but at the same time the back rest is moved to the front coupled in a compulsive action in such a way that the usable seat depth is shortened.

The coupling of both four-bar linkages can occur in various ways. The decisive factor in the concept of the coupling is to make sure that always a shifting of the scat by a path x corresponds to a bigger shifting distance y of the back rest. This may occur for example by the fact that the seat is moved on a smaller arc of a circle than the back rest, the effective length of at least one bracket of the seat support is distinctly shorter than that of the corresponding bracket of the back rest support. It may also occur by the fact that the brackets are arranged in such a way that when the seat is adjusted at least one bracket of the seat support moves essentially crosswise to the seat carriers, but not in their longitudinal direction, while the corresponding bracket of the back rest support moves essentially parallel to the seat carriers. These kinematics can also be achieved for example by an offset angle of the respective brackets against each other.

In a preferred embodiment at least one pair of brackets of the seat support, preferably both front brackets of the seat support are embodied as an adjustable pair of articulated levers synchronized with each other. That way the height of the front edge of the seat can be altered and set independently from the other adjustments. But nevertheless in the use of the language of the existing text, a four-bar linkage exists, because the two levers of the pair of articulated levers, which together realize the respective bracket, are only adjusted against each other for the adjustment of the front edge of the seat, after the adjustment has been completed however, they form one single bracket again.

BRIEF DESCRIPTION OF THE PREFERRED DRAWINGS

Further advantages and characteristics of the invention derive from the other claims as well as the following description of non-restrictive embodiments of the invention, which are illustrated further with regard to the drawing. This drawing shows in:

FIG 1: a side view of a motor vehicle seat in its back position,

FIG. 2: the illustration according to FIG. 1, however in the front position of the motor vehicle seat, FIG. 3: a principal illustration of a motor vehicle seat in a strongly simplified way and of a side view, the illustrated embodiment has two four-bar linkages, which can be adjusted independently from each other, FIG. 4: an illustration according to FIG. 3, but with a coupling this time via high linking at mutual back brackets, and FIG. 5: an illustration according to FIG. 3, however with a coupling of the four-bar linkages via a rocker.

DESCRIPTION OF THE PREFERRED EMBODIMENTS

Figure 1:
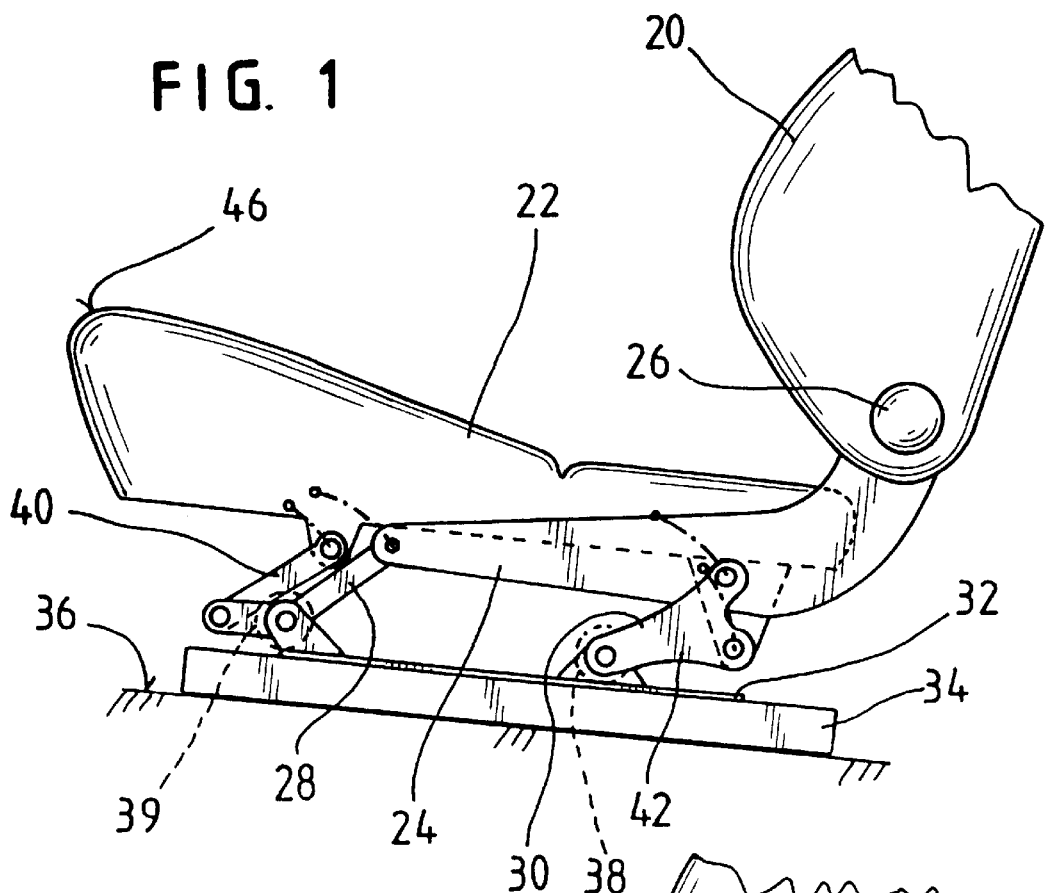

As can be seen in FIG. 1, the motor vehicle seat has a back rest 20 and a seat 22. Both parts have a support part in the already known manner, which provides the mechanical stability, and an upholstery object. The back rest 20 is supported by a back rest support 24. It is mechanically connected with the same via a hinge mounting of the back rest 26 andit is pivotal. The seat support 24 is joined in a hinge with a seat carrier 32 via front brackets of the back rest support 28 and back brackets of the back rest support 30. This seat carrier is again in gear with a bottom carrier 34, which is fixed to an understructure of the body 36 of a motor vehicle. In the manner already known these already mentioned parts exist in pairs, on each side of the seat a pair of carriers 32, 34 is provided, according to that there is a left and a right front bracket of the back rest support 28 each and a left and a right back bracket of the back rest support 30 and so forth per motor vehicle seat. The two front brackets of the back rest support 28 and/or the two back brackets of the back rest support 30 are synchronized with each other via suitable means, for example traverses running crosswise to the carriers 34, 36. To the four-bar linkage, which is formed in such a way from the parts 24, 28, 30, 32, an adjustment device 38 is allocated, which is only indicated here, an already known device from the state of the art can be used. It is allocated for example to a hinge of the four-bar linkage.

The seat 22 can be moved in a relative way against the back rest support 24, it is not directly connected with it in a mechanical way. There is the fact however, which will be referred to at a later stage in the text, that the movements of the seat 22 and the back rest support 24 are hinged in a compulsive action, this applies to all embodiments with the exception of the one according to FIG. 3.

The seat 22 is joined in a hinge again with the seat carrier 32 via front brackets of the seat support 40 and back brackets of the seat support 42 in pairs. The special characteristic of the embodiment according to the FIGS. 1 and 2 lies in the fact that the left back bracket of the back rest support 30 and the left back bracket of the seat support 42 are joined together to a unit in one piece, which resembles a triangle in a sharp angle, the same applies to their right counterparts 30, 42. Thereby the two four-bar linkages of the seat 22 and of the back rest support 24 are hinged in a compulsive action.

Figure 2:
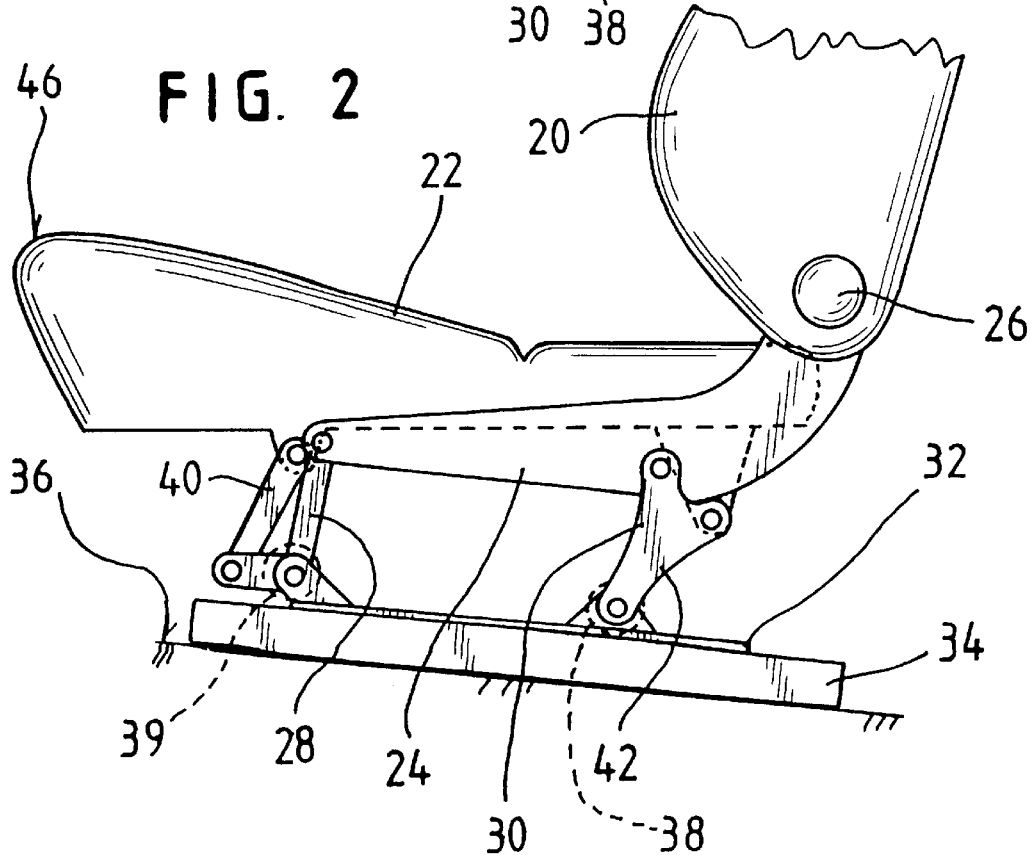

Even though in the embodiment according to the FIGS. 1 and 2 the actual length of the back brackets of the back rest support 30 and the back brackets of the seat support 42 are practically of the same length, it can be instantly stated at this occasion, that the length of all brackets 28, 30, 40, 42 is practically of the same length and that the actual length differs in less than 20%, a relative adjustment of the back rest 20 and the seat 22 is achieved in such a way that, based on the relative position illustrated in FIG. 1, the seat is essentially only lifted up in the back with an adjustment into the position, which is illustrated in FIG. 2, but that the seat is practically not moved forward, while the back rest Support 24 is distinctly moved forward and is only lifted up slightly. The respective curved paths are illustrated in FIG. 1 in a dotted line. These described kinematics are achieved in such a way that the two back brackets of the back rest support 30 include a distinctly bigger angle with the seat carriers 32 than do the back brackets of the seat support 42, in each of the position, for example in the position of the motor vehicle seat according to FIG. 1, which is positioned right in the back. Expressed differently in FIG. 1 the back brackets of the seat support 42 run nearly parallel to the seat carriers 32, while the back brackets of the back rest support 30 include a definite angle with the seat carrier 32, for example an angle between 30 and 40 degrees.

The two front brackets 28, 40 are in the position according to FIG. 1 nearly parallel and stay that way mostly in the other final position, which is illustrated in FIG. 2. The angle between them is 20 at the most, especially 10 degrees at the most. The curve of the movement, which are described by the upper hinge points of both front brackets 28, 40, are also illustrated in FIG. 1 in a dotted line. These four dotted lines end in circles, which represent the hinge points according to FIG. 2. As illustrated further in the FIGS. 1 and 2, the two upper hinge points of the two front brackets 28, 40 stay essentially at the same height, while both hinge points of the back brackets 38, 42 have a clear difference in height in the position according to FIG. 2.

In the embodiments according to the FIGS. 1 and 2 both front brackets of the seat support 40 are embodied as a pair of articulated levers therefore a lower support bracket is connected with the seat carrier 32 via an adjustment device 39. This adjustment device 39 can also be embodied according to the state of the art, as already mentioned earlier. By adjusting the adjustment device 39 the height of the mutual hinge point is adjusted and thereby also the height oft the upper hinge point of the front brackets of the seat support 40, thereby the height of the front edge of the seat 46 is regulated. The adjustment is synchronized for the left and the right front brackets of the seat support 40, for example a connecting shaft of the two hinge points of the pair of articulated levers runs from the one side of the seat to the other side of the seat and connects both pair of articulated levers, which are synchronized in such a way.

In the embodiment according to FIG. 3 the back rest support 24 and the seat 22 are arranged in four-bar linkages, which can be moved independently from each other. That way any desired allocation between the back rest 20 and the seat 22 can occur within the possibilities of movement of the two four-bar linkages. An adjustment device 38, 37, which again, can be adjusted for both sides of the seat in a synchrone manner, is allocated to each of the two four-bar linkages.

FIG. 4 represents an embodiment, with which the back coupling point of the seat 22 moves on a smaller radius than the back coupling point of the back rest support 24. In this case the four-bar linkages are coupled in such a way that they share a mutual hinge point (bottom right) and additionally another hinge point (top right) of both four-bar linkages is in a rigid connection. The back brackets of the back rest support 30 are formed in a normal way, a section of them is used as the back bracket of the seat support 42 each at the same time. Herefore an additional hinge point is provided.

The embodiment according to FIG. 5 represents an arrangement similar to that of FIG. 3, however in this case the two back support brackets 30, 42 of each side of the seat are coupled in a compulsive action via a link 48. Because of that only one adjustment device 38 is needed again for the total adjustment. This one can be arranged within the four-bar linkages at another desired position just as in all other embodiments. The arrangement is only exemplary but not restrictive as illustrated in the other embodiments.

The linkage 48 is connected in a swiveling action with each of a back bracket of the back rest support 30 and the matching, namely the same sided back bracket of the seat support 42 at both its ends. The hinge points are thereby arranged in such a way that the hinge point with the back bracket of the back rest support 30 has a shorter distance to the hinge point with the seat carrier 32 than this is the case with the back bracket of the seat support 42. Because of that a swiveling of the matching back bracket of the seat support 42 around a dictated angle corresponds to a swiveling of a matching back bracket of the back rest support 30 around a larger angle. Preferably the links 40 of both sides of the seat are again synchronized in their movements.

It is understood that the individual embodiments can be altered and/or combined. So, for example the embodiment according to the FIGS. 1 and 2 can be combined with the solution according to FIG. 4, in such a way that instead of a rigid part, which forms the two back support brackets 30, 42, whereby both support brackets 30, 42 are essentially of the same length (FIGS. 1 and 2), a corresponding part is inserted, with which the effective lengths of the back support brackets 30, 42 are distinctly different, as this is the case in the embodiment according to FIG. 4. Expressed differently, the three hinge points in the back area do not have to be on a straight line or have to be essentially on a straight line, as this is the case in the embodiment according to FIG. 4, but they can also be positioned on a triangle.

Other couplings of the two four-bar linkages, for example gate type guides, via sector gears, which are in gear with each other and similar devices are possible.

What is claimed is:

1. A motor vehicle seat having a back rest and a seat, said seat comprising seat carriers, said seat carriers being supported by an adjustable under frame comprising a pair of front brackets of a seat support and a pair of back brackets of the seat support, said under frame being supported by said seat carriers of a longitudinal adjustment device, said back rest being supported by a back rest support via a back hinge mounting for pivoting the back rest relative to the back rest support, said back rest support having a pair of front brackets of the back rest support and a pair of rear brackets of the back rest support and being adjustably hinged to said seat carriers by said pair of front brackets of the back rest support and said pair of rear brackets of the back rest support.

2. The motor vehicle seat according to claim 1 wherein one of said two pairs of brackets of the back rest support is movably connected with one of said two pairs of brackets of the seat support.

3. The motor vehicle seat according to claim 2 further comprising a link wherein said pair of back brackets of the back rest support is connected to said pair of back brackets of the seat support by said link.

4. The motor vehicle seat according to claim 1 wherein said pair of back brackets of the back rest support creates an angle of 10 to 60 degrees with said pair of back brackets of the seat support, and said pair of back brackets of the back rest support runs in an angle to said seat carriers that is always larger than an angle that said pair of back brackets of the seat support creates with said seat carriers.

5. The motor vehicle seat according to claim 1 wherein if said seat is positioned in a most backward position said pair of back brackets of the seat support creates an angle with said seat carriers that is smaller than 20 degrees and that said angle becomes larger if said seat is moved from said most backward position to a position more forward.

6. The motor vehicle seat according to claim 1 wherein said back rest is positioned in a most backward position said pair of back brackets of the seat support creates and angle with said seat carriers that is larger than 30 degrees and that said angle becomes larger if said backrest is moved from said most backward position to a position more forward.

7. The motor vehicle seat according to claim 1 wherein said pair of back brackets of the back rest support and said pair of back brackets of the seat support have total lengths that differ by about less than 20%.

8. The motor vehicle seat according to claim 1 wherein said pair of front brackets of the back rest support and said pair of front brackets of the seat support have total lengths that differ by about less than 20%.

9. The motor vehicle seat according to claim 1 wherein said two pairs of brackets of the back rest support and said two pairs of brackets of the seat support have total lengths that differ by about less than 20%.

10. The motor vehicle seat according to claim 1 wherein said pair of front brackets of the back rest support and said pair of front brackets of the seat support are positioned towards each other in an angle smaller than 20 degrees.

11. The motor vehicle seat according to claim 1 wherein said pair of front brackets of the back rest support and said pair of front brackets of the seat support are positioned towards each other in an angle smaller than 20 degrees.

12. The motor vehicle seat according to claim 1 wherein one of said two pairs of brackets of the back rest support is connected in a rigid manner with one of said two pairs of brackets of the seat support.

13. The motor vehicle seat according to claim 12 wherein said pair of back brackets of the back rest support is connected in a rigid manner with said two pair of back brackets of the seat support.

\* \* \* \* \*